(12) United States Patent
Desmeules

(10) Patent No.: US 8,421,254 B2
(45) Date of Patent: Apr. 16, 2013

(54) STREAM FLOW HYDROELECTRIC GENERATOR SYSTEM, AND METHOD OF HANDLING SAME

(75) Inventor: Serge Desmeules, Chicoutimi (CA)

(73) Assignee: Nordest Marine Inc., Chicoutimi (Quebec) (CA)

( * ) Notice: Subject to any disclaimer, the term of this patent is extended or adjusted under 35 U.S.C. 154(b) by 154 days.

(21) Appl. No.: 13/112,425

(22) Filed: May 20, 2011

(65) Prior Publication Data

US 2011/0285136 A1    Nov. 24, 2011

Related U.S. Application Data

(60) Provisional application No. 61/346,686, filed on May 20, 2010.

(51) Int. Cl.
*F03B 13/00* (2006.01)

(52) U.S. Cl.
USPC .............................................. 290/43; 290/54

(58) Field of Classification Search .................... 290/43, 290/54
See application file for complete search history.

(56) References Cited

U.S. PATENT DOCUMENTS

| | | | | |
|---|---|---|---|---|
| 4,864,152 A | * | 9/1989 | Pedersen | 290/53 |
| 5,510,656 A | * | 4/1996 | Wells | 290/53 |
| 6,531,788 B2 | | 3/2003 | Robson | |
| 6,860,219 B1 | | 3/2005 | Dempster | |
| 7,105,942 B2 | * | 9/2006 | Henriksen | 290/55 |
| 7,242,107 B1 | | 7/2007 | Dempster | |
| 7,471,006 B2 | | 12/2008 | Janca et al. | |
| 7,525,212 B1 | | 4/2009 | Catlin | |
| 7,525,213 B2 | | 4/2009 | Nagata et al. | |
| 7,649,275 B2 | * | 1/2010 | Janca et al. | 290/43 |
| 8,310,079 B2 | * | 11/2012 | Kingston | 290/54 |
| 2008/0018115 A1 | * | 1/2008 | Orlov | 290/54 |
| 2008/0112759 A1 | | 5/2008 | Hardison | |
| 2009/0162144 A1 | | 6/2009 | Ayre | |
| 2009/0304453 A1 | | 12/2009 | Hardison | |

FOREIGN PATENT DOCUMENTS

| | | |
|---|---|---|
| EP | 1639257 B1 | 4/2008 |
| EP | 2028160 A2 | 2/2009 |
| JP | 11208576 | 8/1999 |
| JP | 11247752 | 9/1999 |
| JP | 2007009830 | 1/2007 |
| WO | 2004083031 | 9/2004 |
| WO | 2004085845 | 10/2004 |
| WO | 2006038091 | 4/2006 |
| WO | 2008009130 | 1/2008 |
| WO | 2008100157 | 8/2008 |
| WO | 2008122004 | 10/2008 |
| WO | 2009026620 | 3/2009 |

(Continued)

*Primary Examiner* — Tho D Ta
(74) *Attorney, Agent, or Firm* — Sutherland Asbill & Brennan LLP

(57) ABSTRACT

The hydroelectric generator system can include a structure supporting a plurality of watermill units and having an enclosed internal volume and a plurality of lower openings, a stabilizer reservoir having an internal volume and positionable above a center of gravity of the system and an aperture, and connection tubes providing internal fluid flow communication between the stabilizer reservoir and the internal volume of the structure; wherein air can be extracted from the internal volume of the structure via the stabilizer reservoir, and blown into the internal volume of the structure via the stabilizer reservoir, to lower or raise the hydroelectric generator system in water, respectively.

18 Claims, 2 Drawing Sheets

FOREIGN PATENT DOCUMENTS

| | | |
|---|---|---|
| WO | 2009081162 | 7/2009 |
| WO | 2009088302 | 7/2009 |
| WO | 2010002778 | 1/2010 |

* cited by examiner

STREAM FLOW HYDROELECTRIC GENERATOR SYSTEM, AND METHOD OF HANDLING SAME

CROSS-REFERENCE TO RELATED APPLICATIONS

This application claims priority of U.S. provisional application 61/346,686 filed 20 May 2010 by applicant, the contents of which are hereby incorporated by reference.

FIELD

The specification generally relates to the field of hydroelectric generator systems which are used to extract energy from a stream of water (i.e. does not relate to a dam), and more precisely, to the type which are anchored to the ground.

BACKGROUND

Extracting energy from water has been done for ages with watermills and the like. Hydroelectric power plants are well known and widespread today and typically use a turbine generator which extracts energy from river water accumulated by a dam. However, the field of stream flow hydroelectric generators is relatively recent.

Stream flow hydroelectric generators are of the type which are typically to be used to extract energy from natural water currents. Stream flow hydroelectric generators have been designed to extract energy from the currents generated by the tides, or from rivers for instance.

There have been two main approaches to stream flow hydroelectric generators. The first approach is to suspend watermills at mid-depth from above. The second approach concerns providing the watermills on a sinking base which is anchored to the ground.

An example of an anchored hydroelectric generator is provided in the international patent application published under no. WO 2009/081162 and also published as United States application publication US 2009/0162144. Such hydroelectric generators have been satisfactory to a certain degree, but have some limitations at least with respect to certain applications.

One of these limitations is linked to the relative complexity of the method of installation. Installation is described in this publication as requiring the combined action of both a floating crane and a workboat. Such equipments are typically quite expensive, not always accessible, and have limited versatility, especially concerning a floating crane.

Also, on anchored systems, maintenance is an issue. Either it requires retrieval of the system, the inconveniences of which will appear from the description above, or it requires the intervention of skilled divers, which is also undesirable given the costs and potential safety considerations.

It will thus be understood that there remained room for improvement.

SUMMARY

In accordance with one aspect, there is provided a stream flow hydroelectric generator system which has a hollow structure having an internal volume acting as an air chamber which can keep the system afloat so it can be towed by a single boat to a desired location. Once the location is reached, air is evacuated from the internal volume and water is allowed in, thereby sinking the system. The system has a stabilizer reservoir which can be positioned above the center of gravity of the system during submersion, and connection tubes which connect the stabilizer reservoir to the internal volume. By evacuating the air from the stabilizer reservoir, the stabilizer reservoir is the last portion of the system from which air is evacuated. The floatation force from the contained air acts to stabilize the system during submersion by creating a stabilizing moment of force when the center of gravity is moved from under the stabilizer reservoir. This moment of force becomes greater due to the increasing lever arm when the center of gravity is moved further away due to for example the action of current on the structure. The connection tubes are resistant to compression forces during submersion and thereby maintain the position of the stabilizer reservoir relative to the structure. To raise the system, air can be blown into the stabilizer reservoir using a pump on the boat and a hose, thereby evacuating water from the internal volume. Such a stream flow hydroelectric generator provides highly convenient manipulation ability, and can conveniently be provided with suction anchorage. It can be used for tidal streams, or on a river bed, for instance.

In accordance with another aspect, there is provided a hydroelectric generator system comprising a structure supporting a plurality of watermill units and having an enclosed internal volume and a plurality of lower openings, a fluid aperture positionable above a center of gravity of the system, and connection tubes providing internal fluid flow communication between the fluid aperture and the internal volume of the structure and which can be made compression-resistant when the fluid aperture is positioned above the center of gravity; wherein air can be extracted from the internal volume of the structure via the fluid aperture, and blown into the internal volume of the structure via the fluid aperture, to lower or raise the hydroelectric generator system in water, respectively.

In accordance with another aspect, there is provided a hydroelectric generator system comprising: a structure having a peripheral tubular reservoir having a number of sections all extending in a laterally extending plane, between and in internal fluid flow communication with corresponding ones of a plurality of posts extending across the plane and each having an upper end to receive a corresponding watermill unit and a lower end for anchoring the structure to the ground, the posts each having an opening below the plane; a stabilizer reservoir being laterally aligned with a center of gravity of the system and being positionable above the center of gravity of the system, the stabilizer having an aperture; connection tubes providing internal fluid flow communication between the stabilizer reservoir and corresponding ones of the posts; and a combined enclosed internal volume between the openings of the posts and the aperture of the stabilizer reservoir, including internal volumes of the stabilizer reservoir, the connecting tubes, the peripheral tubular reservoir, and the posts, the combined enclosed internal volume being large enough to contain a sufficient amount of air at operating pressures to impart buoyancy to the system; wherein air can be extracted from the combined internal volume via the stabilizer reservoir, thereby filling the combined internal volume with water and lowering the system, and blown into the combined internal volume via the stabilizer reservoir, thereby expulsing water through the openings of the posts and raising the system in the water.

In accordance with another aspect, there is provided a method of handling a hydroelectric generator system comprising, evacuating air out from the aperture of the of the stabilizer reservoir, thereby submerging the system and lowering it to the ground In accordance with another aspect, there is provided a method of handling a hydroelectric generator system previously submerged in water and resting against the ground, comprising blowing air into the aperture of the of the stabilizer reservoir and thereby evacuating water from the internal volume, thereby rendering the system buoyant.

In accordance with another aspect, there is provided a hydroelectric generator system comprising a plurality of watermill units mounted on watermill unit tubular posts having a hollow center communicating with a open lower end, the hollow center of the tubular posts being fluidly interconnected by corresponding hollow structural beams defining a structural periphery of the watermill generator, articulated hollow arm structural tubes connecting the posts to a hollow buoy element, the hollow buoy element being geometrically centrally disposed relative the structural periphery and being movable via articulations of the hollow arms between an upper position above the center of gravity of the watermill generator and a lower position, and a fluid tube connected to the buoy element for pumping air thereinto and evacuating air therefrom.

DESCRIPTION OF THE FIGURES

In the figures.

DETAILED DESCRIPTION

Figure 1:
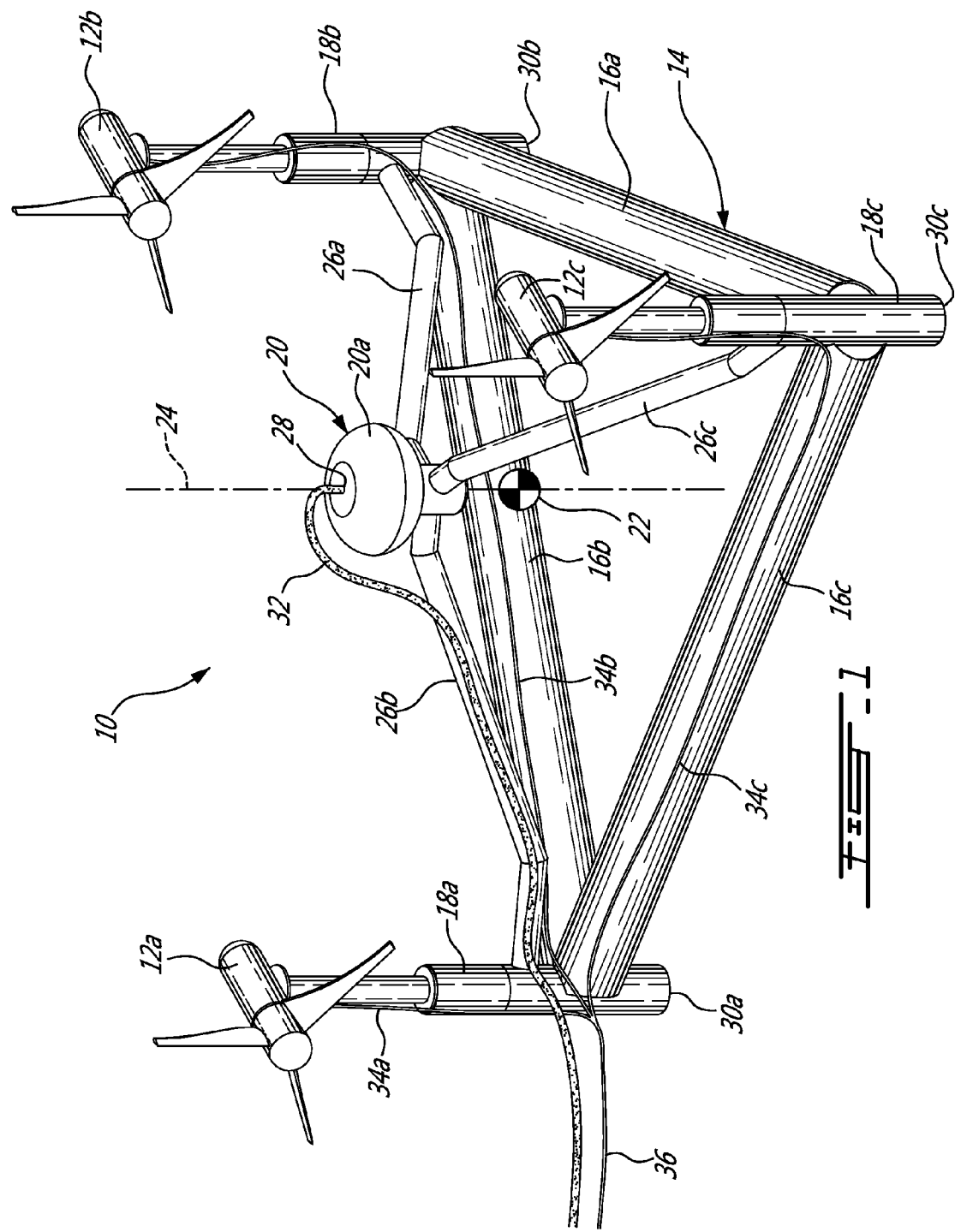
FIG. 1 is an oblique view of a hydroelectric generator system.

FIG. 1 illustrates an example of a stream flow hydroelectric generator system 10. The hydroelectric generator system 10 has a number of watermill units 12a, 12b, 12c supported on a common structure 14. The structure 14 has a number of peripheral sections 16a, 16b, 16c which are tubular and hollow and therefore also act as a reservoir. The watermill units 12a, 12b, 12c are supported on corresponding posts 18a, 18b, 18c. The posts 18a, 18b, 18c are also hollow, and their enclosed internal volume is in fluid flow communication with the internal volume of the peripheral sections 16a, 16b, 16c. The peripheral sections 16a, 16b, 16c are all aligned along a common plane which is intersected by the posts 18a, 18b, 18c.

The hydroelectric generator system 10 can also be seen to include a stabilizer 20 which is aligned with the center of gravity 22 of the system 10 along an axis 24 which is normal to the plane of the peripheral sections 16a, 16b, 16c. In this embodiment, the stabilizer 20 is a reservoir 20a with an internal volume. The positioning of the stabilizer reservoir 20a above the center of gravity 22 and resulting stabilizer drag force against current, combined with the floatation force which is caused by buoyancy of the stabilizer 20 when it is filled with air, can both contribute to maintain the stability of the system 10 during submersion, as will be detailed further below. The stabilizer reservoir 20a is in fluid flow communication with the internal volume of the posts 18a, 18b, 18c and peripheral sections 16a, 16b, 16c via a number of connection tubes 26a, 26b, 26c. The connection tubes 26a, 26b, 26c resist compression forces during submersion and thereby maintain the relative position of the stabilizer reservoir 20a with respect to the center of gravity 22 and the structure 14. In this embodiment, the connection tubes 26a, 26b, 26c are rigid, but they can alternately be articulated as will be detailed below.

As it will be understood from the discussion above, a combined internal volume in fluid flow communication is contained in the hollow structure 14, connection tubes 26a, 26b, 26c, and stabilizer reservoir 20a. This combined internal volume is enclosed, except for an aperture 28 provided in the stabilizer reservoir and openings 30a, 30b, 30c provided in the posts 18a, 18b, 18c below the plane of the peripheral sections 16a, 16b, 16c. In this particular embodiment, the aperture 28 in the stabilizer reservoir 20a is provided at the top of an ovoid shape body thereof, which allows air to be completely evacuated from the combined internal volume before allowing water out, and the aperture 28 is provided as a hose port, connectively receiving a hose 32. Further, the openings 30a, 30b, 30c are provided in the lower ends of the posts 18a, 18b, 18c as open ends of the post tubes, which provides for suction anchorage ability as will be detailed below. In alternate embodiments, the openings can be provided on the sides of the post tubes, for instance.

The posts can be provided with annular discs (not shown) to limit the penetration ability of the open ends of the post tubes into the ground. Further, telescoping lower sections of the post tubes can be provided for adaptability to uneven terrain, in which case the annular discs can be provided on the telescoping lower sections.

Electrical cables 34a, 34b, 34c connect each one of the watermill units 12a, 12b, 12c to extract the electricity they generate. The electrical cables 34a, 34b, 34c can be joined together into a bigger cable 36 which is attached down a given one of the posts and rests against the ground. In the illustrated embodiment, the hose 32 runs down a given one of the connection tubes and reaches the bigger electrical cable 36 to which it is attached in a manner that both can be recovered at once.

In this particular design, the internal volume in the peripheral sections 16a, 16b, 16c and in the posts 18a, 18b, 18c below the plane of the peripheral sections 16a, 16b, 16c is designed so that air contained therein provides sufficient buoyancy to maintain the hydroelectric generator system 10 afloat prior to air evacuation. Further, the combined internal volume is such that when it is filled with air at operating pressures at seabed/riverbed level, the difference in weight between the compressed air and the evacuated water is sufficient to compensate for the weight of the system 10 and result in buoyancy.

It will be understood that in the specific embodiment illustrated, the watermill units 12a, 12b, 12c are in a number of three, but in alternate embodiments, a higher number of watermill units can be provided on a corresponding number of posts, and the structure adapted accordingly, for instance.

Figure 2A:
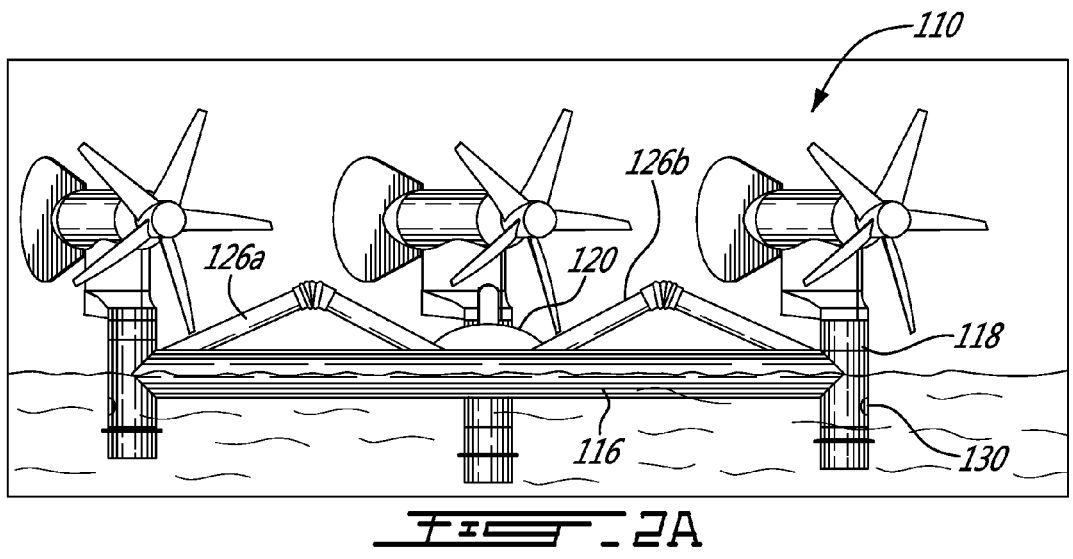
FIGS. 2A to 2C schematically illustrate handling of the hydroelectric generator system of FIG. 1.
Figure 2B:
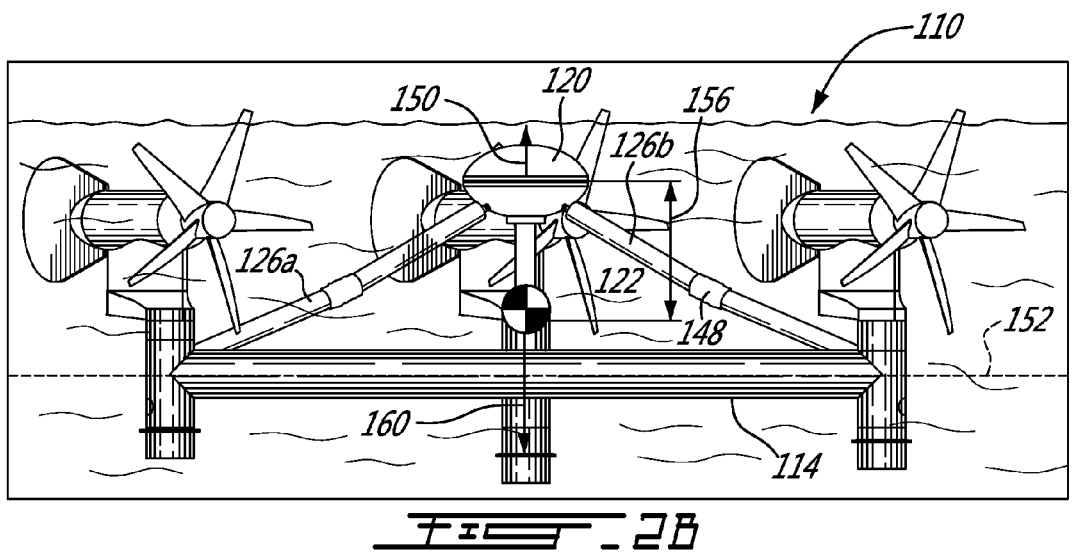
Figure 2C:
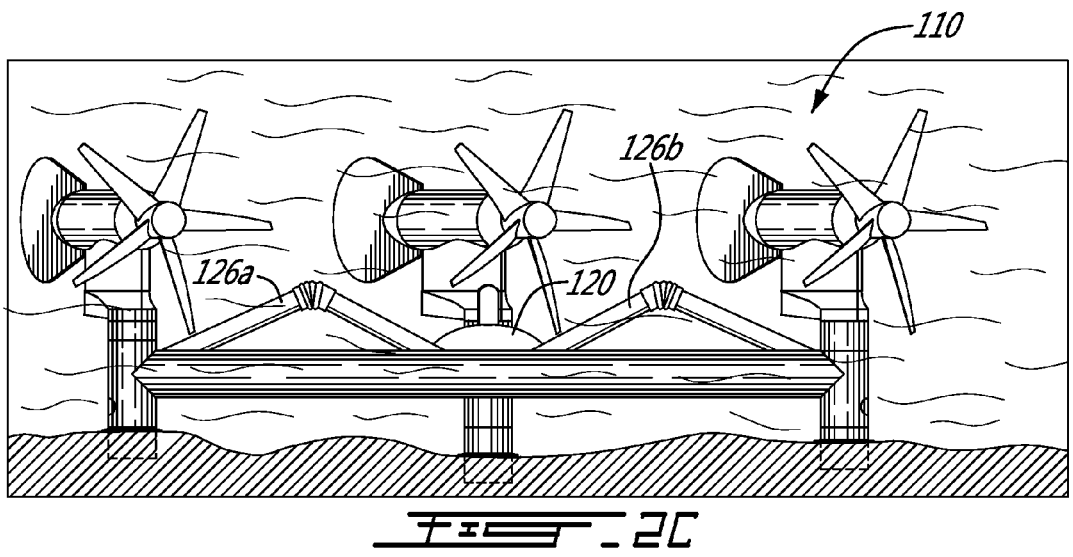

FIGS. 2A to 2C illustrate handling of an alternate embodiment of a streamflow hydroelectric generator system 110. In this embodiment, the connection tubes 126a, 126b, 126c are articulated which allows the stabilizer 120 to be moved out from interference with the stream of water, which is optional, and all the other features are similar to that described above in relation to FIG. 1.

As can be seen in FIG. 2A, the combined internal volume can be entirely filled with air which causes the hydroelectric watermill system to stay afloat on the surface of the water. Henceforth, the hydroelectric watermill system 110 can simply be towed by a boat to the desired position which can avoid the hindering intervention of a floating crane.

Once at the desired position, air is evacuated from the combined internal volume. This can be achieved by operating a valve at the other end of the hose (32, FIG. 1), for instance, and results in allowing water to enter the combined internal volume through the openings 130 in the posts 118. The weight of the water reduces the buoyancy of the hydroelectric generator system 110 and results in eventually submerging the system 110 as shown in FIG. 2B. Because the water enters the posts 118, and does not enter directly into stabilizer reservoir 120, the stabilizer reservoir 120 stays filled with air last, and maintains its floatability even when the peripheral sections 116 are filled with water and sink. The floatability of the stabilizer reservoir 120 exerts a floatation force 150 which moves the stabilizer reservoir 120 upwardly relative to the center of gravity 122, and activates the articulations 148 of the connection tubes, until the stabilizer reservoir 120 reaches a maximum height where it is positioned above the center of gravity 122 by a given distance.

Turning to FIG. 2B, the rate of submersion of the hydroelectric generator system 110 is affected by the amount of air which is evacuated. In accordance with one embodiment, the air in the stabilizer reservoir 120 is not be evacuated until the hydroelectric generator system 110 has, or is about to reach the ground. The amount of internal volume and the weight of the stabilizer reservoir 120 are two variables which affect the magnitude of the upward floatation force 150 it generates when submerged and filled with air. The size and hydrodynamic ratio of the stabilizer reservoir affect the drag force imparted to it by the current.

When subjected to current, the structure can suffer a drag force which will cause it to tilt from the horizontal in the direction of the current relative to the stabilizer 120. The drag force applied to the stabilizer by the current causes an opposite moment which can compensate the tilting effect to a certain extent. The upward floatation force 150 which can be present if the stabilizer 120 is buoyant also causes an opposite moment which can compensate the tilting effect to a certain extent. The magnitude of the upward floatation force 150, the given distance 156 between the maximum height and the center of gravity 122, and the hydrodynamic drag on the stabilizer reservoir 120 above the center of gravity 122, are thus factors which influence the stability of the hydroelectric generator system 110 during submersion.

More precisely, when there are currents in the water during submersion, such currents can apply drag forces on the hydroelectric generator system 110 which can tend to tilt the plane 152 of the peripheral sections 118 off from the horizontal. The relative position of the stabilizer reservoir 120 relative to the structure 114, and more precisely relative to the center of gravity 122 of the structure 114, is maintained by the connection tubes 126*a*, 126*b* which resist to compression forces during submersion. Hydrodynamic drag also affects the stabilizer reservoir 120 above the center of gravity 122 during submersion, which tends to at least partially compensate the drag forces affecting the peripheral sections 116 and posts 118 below the center of gravity 122, which can act to tilt the hydroelectric generator system 110. During tilting, the force of gravity 160 which acts on the center of gravity 122 can become horizontally offset from the floatation force 150 by a lever arm distance. The difference in magnitude between these two vertical forces 150, 160 multiplied by the lever arm distance equates to a stabilizing moment of force which acts to rotate the hydroelectric generator system towards the horizontal. The stronger the current, the more it can cause the hydroelectric generator system 110 to tilt, but the more the hydroelectric generator system 110 tilts, the greater the lever arm, and the greater the stabilizing moment of force. An equilibrium can thus be reached. The given distance between the floatation force 150 and the center of gravity 122, and the magnitude of the floatation force 150, should thus be designed to provide a satisfactory equilibrium angle in a worst case scenario, i.e. in the context of the strongest currents which could be expected in a given application.

Turning now to FIG. 2C, as the stabilized hydroelectric generator system 110 is progressively lowered toward the ground, it eventually comes into contact with the ground, with which it is to be anchored. At this point, air can be completely evacuated from the stabilizer reservoir 120. The optional use of articulated connection tubes 126*a*, 126*b*, at this point, can be useful, because it allows the stabilizer reservoir 120 to be lowered by the action of its weight, until it is moved at least partially out from interference with the windmill units. In some applications, the weight of the system 110 acting against the posts 118 can be sufficient to provide a satisfactory anchor. The use of tubular posts with open lower ends can be useful to this end. Evacuating the remaining air from the stabilizer reservoir can also cause a suction effect which helps providing strength to the anchorage. If desired, the suction effect can be increased by using a pump. An air pump which has a water lock unit to allow it to pump water can be practical to this end.

At this point, the hydroelectric generator system can be ready for operation, i.e. for the windmill units to be operated by the energy of the stream flow (whether tidal of permanent such as in a river), and the electricity extracted using the electric cable (see 36, FIG. 1).

The hydroelectric generator system can also be retrieved in a relatively convenient manner, for any reason (maintenance, change of location, etc.). This will now be described.

Air can be pumped into the stabilizer reservoir using the air pump, via the hose 32. If the posts 18*a*, 18*b*, 18*c* are provided with open ends 30*a*, 30*b*, 30*c* in fluid communication, blowing the air into the stabilizer reservoir 120 will evacuate water from the open ends 30*a*, 30*b*, 30*c* thereby breaking the suction effect and potentially driving the hydroelectric generator system 10 upwardly.

Referring to FIG. 2B, the air first fills the stabilizer reservoir 120, which will cause it to generate a floatation force 150 which will first move it upwardly into the maximum-height, stabilizing position, and thereafter maintain the stability of the system 110 during ascension. The air filling the combined internal volume eventually becomes sufficient to overcome the weight of the hydroelectric generator system 110 and to impart floatation which will eventually bring it up to the surface, where it can be towed (see FIG. 2A).

Because water pressure varies depending on the depth, the volume of the air will tend to vary consequently, which affects buoyancy. Therefore, in certain applications, it can be proper to monitor the fluid exchange during either installation or retrieval.

In the embodiments illustrated, the shape of the system is equilateral triangular when viewed from above. It will be understood that other shapes, potentially involving a greater number of windmill units, can be used in alternate embodiments.

In an alternate embodiment, the shape of the stabilizer reservoir can be made to voluntarily cause a stronger drag force to more strongly compensate the drag force tilting the hydroelectric generator system. However, this may be less desirable in embodiments where the arm are not embodiment. The height of the stabilizer reservoir will also affect the compensating moment caused by the drag force on the stabilizer reservoir. In another alternate embodiment, the stabilizer can be configured only to provide a compensating stabilizer drag force and have no reservoir therein.

In the embodiments described above, the hollow structure is made of aluminium. Although aluminium can be a practical choice, other materials can be used as well.

The examples described above and illustrated are provided for illustrative purposes. The scope is indicated by the appended claims.

What is claimed is:

1. A hydroelectric generator system comprising
a structure having a peripheral tubular reservoir having a number of sections all extending in a laterally extending plane, between and in internal fluid flow communication with corresponding ones of a plurality of posts extending across the plane and each having an upper end to receive a corresponding watermill unit and a lower end for anchoring the structure to the ground, the posts each having an opening below the plane;
a stabilizer reservoir being laterally aligned with a center of gravity of the system and being positionable above the center of gravity of the system, the stabilizer reservoir having an aperture;
connection tubes providing internal fluid flow communication between the stabilizer reservoir and corresponding ones of the posts; and
a combined enclosed internal volume between the openings of the posts and the aperture of the stabilizer reservoir, including internal volumes of the stabilizer reservoir, the connecting tubes, the peripheral tubular reservoir, and the posts, the combined enclosed internal volume being large enough to contain a sufficient amount of air at operating pressures to impart buoyancy to the system;
wherein air can be extracted from the combined internal volume via the stabilizer reservoir, thereby filling the combined internal volume with water and lowering the system, and blown into the combined internal volume via the stabilizer reservoir, thereby expulsing water through the openings of the posts and raising the system in the water.

2. The hydroelectric generator system of claim 1 wherein the openings in the posts are provided in the lower ends to anchor the structure by suction.

3. The hydroelectric generator system of claim 1 wherein the connection tubes rigidly maintain the position of the stabilizer reservoir relative the structure during use.

4. The hydroelectric generator system of claim 1 wherein the connection tubes are articulated and the stabilizer reservoir can thereby be moved downwardly from its position above the center of gravity to at least partially remove it from interference from the water stream of the watermill units when they are in operation on the anchored structure.

5. The hydroelectric generator system of claim 4 wherein the connection tubes support compression forces during lowering and raising.

6. The hydroelectric generator system of claim 1 wherein the aperture of the stabilizer reservoir is provided at a top thereof.

7. The hydroelectric generator system of claim 1 wherein the internal volume of the peripheral tubular reservoir and of the posts below the plane is sufficient to compensate for the weight of the hydroelectric generator system and keep it afloat when filled with air.

8. The hydroelectric generator system of claim 1 wherein the open lower ends of the posts are telescopically extendible.

9. The hydroelectric generator system of claim 1 wherein the posts have annular retention discs extending laterally therefrom.

10. The hydroelectric generator system of claim 1 wherein the size of the internal volume of the stabilizer and the distance between the stabilizer and the center of gravity are designed to provide a stabilizing moment when the plane is not aligned to the horizontal, sufficient to maintain the stability during operation.

11. The hydroelectric generator system of claim 1 wherein the posts are in a number of three, with three sections interconnecting the posts in a triangular lateral configuration, the stabilizer reservoir being located along an axis normal to the plane and intersecting the center of the triangular lateral configuration.

12. A hydroelectric generator system comprising a structure supporting a plurality of watermill units and having an enclosed internal volume and a plurality of lower openings, a fluid aperture positionable above a center of gravity of the system, and connection tubes providing internal fluid flow communication between the fluid aperture and the internal volume of the structure and which can be made compression-resistant when the fluid aperture is positioned above the center of gravity; wherein air can be extracted from the internal volume of the structure via the fluid aperture, and blown into the internal volume of the structure via the fluid aperture, to remove or impart buoyancy to the hydroelectric generator system in water, respectively.

13. The hydroelectric generator system of claim 12 wherein the fluid aperture is provided as part of a stabilizer, the stabilizer receiving the connection tubes.

14. The hydroelectric generator system of claim 13 wherein the stabilizer has a reservoir having an internal volume providing buoyancy to the stabilizer when filled with air.

15. A method of handling a hydroelectric generator system as claimed in claim 12, the method comprising, evacuating air out from the aperture, thereby submerging the system and lowering it to the ground.

16. The method of claim 15, further comprising towing the floating hydroelectric system to a location prior to said extracting air.

17. A method of handling a hydroelectric generator system as claimed in claim 16 previously submerged in water and resting against the ground, the method comprising, blowing air into the aperture and thereby evacuating water from the internal volume, thereby imparting buoyancy to the system.

18. The method of claim 17 wherein the system is previously anchored by suction, and the water is evacuated from the lower end of posts receiving the watermill units, thereby freeing the system from the anchoring by suction.

* * * * *